US009201161B2

(12) United States Patent
Goldner et al.

(10) Patent No.: US 9,201,161 B2
(45) Date of Patent: Dec. 1, 2015

(54) FIBER OPTIC PIPELINE MONITORING SYSTEMS AND METHODS OF USING THE SAME

(75) Inventors: Eric Lee Goldner, Valencia, CA (US); Gerald Robert Baker, West Hills, CA (US); James Kengo Andersen, Westlake Village, CA (US); Agop Hygasov Cherbettchian, Santa Monica, CA (US)

(73) Assignee: Pacific Western Bank, Los Angeles, CA (US)

( * ) Notice: Subject to any disclaimer, the term of this patent is extended or adjusted under 35 U.S.C. 154(b) by 469 days.

(21) Appl. No.: 13/577,083

(22) PCT Filed: Feb. 17, 2011

(86) PCT No.: PCT/US2011/025248
§ 371 (c)(1),
(2), (4) Date: Oct. 16, 2012

(87) PCT Pub. No.: WO2011/103290
PCT Pub. Date: Aug. 25, 2011

(65) Prior Publication Data
US 2013/0025375 A1 Jan. 31, 2013

Related U.S. Application Data

(60) Provisional application No. 61/367,515, filed on Jul. 26, 2010, provisional application No. 61/338,466, filed on Feb. 18, 2010.

(51) Int. Cl.
*G01H 9/00* (2006.01)
*G01V 8/10* (2006.01)
(Continued)

(52) U.S. Cl.
CPC ............... *G01V 8/10* (2013.01); *G01B 11/161* (2013.01); *G01V 1/226* (2013.01); *G01V 8/24* (2013.01)

(58) Field of Classification Search
CPC ........... G01V 1/226; G01V 8/10; G01V 8/24; G01B 11/161

USPC ............... 73/655, 659; 356/73.1; 250/227.14, 250/227.19
See application file for complete search history.

(56) References Cited

U.S. PATENT DOCUMENTS

| 4,155,005 A | 5/1979 | Knowlton et al. |
| 4,255,015 A | 3/1981 | Adams et al. |

(Continued)

FOREIGN PATENT DOCUMENTS

| CN | 2643296 | 9/2004 |
| CN | 101199413 | 6/2008 |

(Continued)

OTHER PUBLICATIONS

International Search Report for International Application No. PCT/US2010/053659 issued by the Korean Intellectual Property Office on Aug. 2, 2011.

(Continued)

*Primary Examiner* — J M Saint Surin
(74) *Attorney, Agent, or Firm* — Stradley Ronon Stevens & Young, LLP

(57) ABSTRACT

An optical detection system for monitoring a pipeline. The optical detection system includes a host node in the vicinity of, or remote from, a pipeline to be monitored. The optical detection system includes (a) an optical source for generating optical signals, and (b) an optical receiver. The optical detection system also includes a plurality of fiber optic sensors local to the pipeline for converting at least one of vibrational and acoustical energy to optical intensity information, each of the fiber optic sensors having: (1) at least one length of optical fiber configured to sense at least one of vibrational and acoustical energy; (2) a reflector at an end of the at least one length of optical fiber; and (3) a field node for receiving optical signals from the host node, the field node transmitting optical signals along the at least one length of optical fiber, receiving optical signals back from the at least one length of optical fiber, and transmitting optical signals to the optical receiver of the host node.

22 Claims, 10 Drawing Sheets

(51) Int. Cl.
  *G01V 1/22*    (2006.01)
  *G01V 8/24*    (2006.01)
  *G01B 11/16*   (2006.01)

(56) References Cited

U.S. PATENT DOCUMENTS

| | | | |
|---|---|---|---|
| 4,292,628 | A | 9/1981 | Sadler |
| 4,800,267 | A | 1/1989 | Freal et al. |
| 4,826,322 | A | 5/1989 | Philips |
| 4,872,754 | A * | 10/1989 | Ensley ............... 356/464 |
| 4,879,755 | A | 11/1989 | Stolarczyk et al. |
| 4,893,930 | A | 1/1990 | Garrett et al. |
| 4,994,668 | A | 2/1991 | Lagakos et al. |
| 5,011,262 | A | 4/1991 | Layton |
| 5,051,799 | A | 9/1991 | Paul et al. |
| 5,137,359 | A * | 8/1992 | Steele ............... 356/464 |
| 5,172,117 | A | 12/1992 | Mills et al. |
| 5,227,857 | A | 7/1993 | Kersey |
| 5,319,440 | A * | 6/1994 | Kersey et al. ............... 356/460 |
| 5,367,376 | A | 11/1994 | Lagakos et al. |
| 5,397,891 | A | 3/1995 | Udd et al. |
| 5,493,390 | A | 2/1996 | Varasi et al. |
| 5,680,489 | A | 10/1997 | Kersey |
| 5,712,932 | A | 1/1998 | Alexander et al. |
| 5,798,834 | A | 8/1998 | Brooker |
| 5,986,749 | A | 11/1999 | Wu et al. |
| 6,104,492 | A | 8/2000 | Giles et al. |
| 6,157,711 | A | 12/2000 | Katz |
| 6,281,976 | B1 | 8/2001 | Taylor et al. |
| 6,328,837 | B1 | 12/2001 | Vohra et al. |
| 6,381,048 | B1 | 4/2002 | Chraplyvy et al. |
| 6,453,022 | B1 | 9/2002 | Weinman, Jr. |
| 6,498,652 | B1 * | 12/2002 | Varshneya et al. ............ 356/477 |
| 6,654,521 | B2 | 11/2003 | Sheng et al. |
| 6,819,812 | B2 | 11/2004 | Kochergin et al. |
| 6,891,621 | B2 | 5/2005 | Berg et al. |
| 6,900,726 | B2 | 5/2005 | Graves |
| 7,013,729 | B2 | 3/2006 | Knudsen et al. |
| 7,282,697 | B2 | 10/2007 | Thomas et al. |
| 7,683,312 | B2 | 3/2010 | Goldner et al. |
| 7,840,105 | B2 | 11/2010 | Goldner et al. |
| 7,994,469 | B2 | 8/2011 | Goldner et al. |
| 7,999,946 | B2 | 8/2011 | Andersen et al. |
| 8,295,663 | B2 * | 10/2012 | Hamamoto ............... 385/43 |
| 2002/0063866 | A1 | 5/2002 | Kersey et al. |
| 2002/0064331 | A1 | 5/2002 | Davis et al. |
| 2002/0064332 | A1 | 5/2002 | Martin |
| 2003/0094281 | A1 | 5/2003 | Tubel |
| 2003/0145654 | A1 | 8/2003 | Knudsen et al. |
| 2004/0046111 | A1 | 3/2004 | Swierkowski |
| 2004/0060697 | A1 | 4/2004 | Tilton |
| 2004/0246816 | A1 | 12/2004 | Ogle |
| 2005/0076713 | A1 | 4/2005 | Knudsen |
| 2005/0097955 | A1 | 5/2005 | Berg et al. |
| 2005/0111788 | A1 | 5/2005 | Tsuyama |
| 2006/0120675 | A1 | 6/2006 | Goldner et al. |
| 2007/0065149 | A1 | 3/2007 | Stevens et al. |
| 2008/0137589 | A1 | 6/2008 | Barrett |
| 2009/0101800 | A1 | 4/2009 | Goldner et al. |
| 2009/0140852 | A1 | 6/2009 | Stolarczyk et al. |
| 2009/0210168 | A1 | 8/2009 | Vincelette |
| 2010/0005860 | A1 | 1/2010 | Coudray et al. |
| 2010/0219334 | A1 | 9/2010 | LeGrand |
| 2010/0247111 | A1 * | 9/2010 | Li et al. ............... 398/177 |
| 2013/0034351 | A1 * | 2/2013 | Goldner et al. ............... 398/25 |

FOREIGN PATENT DOCUMENTS

| | | |
|---|---|---|
| CN | 101242224 | 8/2008 |
| JP | 2001-221684 | 8/2001 |
| JP | 2006-172339 | 6/2006 |
| JP | 2007-232515 | 9/2007 |
| KR | 10-1997-0002776 | 1/1997 |
| KR | 10-2002-0008457 | 1/2002 |
| WO | 99/05493 | 2/1999 |
| WO | 2011/050227 | 4/2011 |

OTHER PUBLICATIONS

International Search Report for International Application No. PCT/US2010/053763 issued by the Korean Intellectual Property Office on Jul. 28, 2011.

International Search Report for International Application No. PCT/US2011/024465 issued by the Korean Intellectual Property Office on Oct. 27, 2011.

International Search Report for International Application No. PCT/US2011/025206 issued by the Korean Intellectual Property Office on Oct. 17, 2011.

International Search Report for International Application No. PCT/US2012/022356 issued by the Korean Intellectual Property Office on Sep. 3, 2012.

International Search Report for International Application No. PCT/US2012/028224 issued by the Korean Intellectual Property Office on Sep. 24, 2012.

International Search Report for International Application No. PCT/US2011/025248 issued by the Korean Intellectual Property Office on Oct. 11, 2011.

1st Office Action dated May 31, 2013 issued by the State Intellectual Property Office (SIPO) of the People's Republic of China for Chinese Patent Application No. 201080047796.6.

International Search Report for International Application No. PCT/US2012/051338 issued by the Korean Intellectual Property Office on Mar. 14, 2013.

* cited by examiner

FIBER OPTIC PIPELINE MONITORING SYSTEMS AND METHODS OF USING THE SAME

RELATED APPLICATIONS

This application claims the benefit of priority to U.S. Provisional Patent Application Ser. No. 61/338,466, filed on Feb. 18, 2010, and to U.S. Provisional Patent Application Ser. No. 61/367,515, filed on Jul. 26, 2010, the contents of both of which are incorporated in this application by reference.

TECHNICAL FIELD

This invention relates generally to the field of pipeline monitoring and, more particularly, to improved systems and methods for using fiber optics for monitoring a pipeline.

BACKGROUND OF THE INVENTION

Fiber optic sensing systems have been used in a number of applications including perimeter security, acoustic sensing, and leak detection. Examples of conventional fiber optic sensing systems include (1) modal interference-based systems; (2) time-correlated Mach-Zehnder interferometer-based systems; and (3) coherent Rayleigh backscattering-based systems. Each of these conventional systems suffers from certain deficiencies.

For example, modal interference-based systems provide very limited information about an event such as the location and/or time of an event. Further, such systems have difficulty distinguishing between multiple simultaneous events. Time-correlated Mach-Zehnder-based systems have difficulty discerning continuous events (e.g., a pipe leak). Coherent Rayleigh backscattering-based systems suffer from high interrogator costs and limited sensitivity. Further, certain of these conventional systems utilize photonics boxes located throughout an array that require electrical power to be provided locally, rendering such systems impractical for long distance applications.

Thus, a need exists for, and it would be desirable to provide, improved optical detection systems for pipeline monitoring.

BRIEF SUMMARY OF THE INVENTION

To meet this and other needs, and in view of its purposes, the present invention provides, according to an exemplary embodiment, an optical detection system for monitoring a pipeline. The optical detection system is in the vicinity of, or remote from, the pipeline to be monitored. The optical detection system includes a host node including (a) an optical source for generating optical signals, and (b) an optical receiver. The optical detection system also includes a plurality of fiber optic sensors local to the pipeline for converting vibrational energy to optical intensity information, each of the fiber optic sensors including: (1) at least one length of optical fiber configured to sense vibrational energy; (2) a reflector at an end of the at least one length of optical fiber; and (3) a field node for receiving optical signals from the host node, the field node transmitting optical signals along the at least one length of optical fiber, the field node receiving optical signals back from the at least one length of optical fiber, and the field node transmitting optical signals to the optical receiver of the host node.

According to another exemplary embodiment of the present invention, another optical detection system for monitoring a pipeline is provided. The optical detection system includes a host node in the vicinity of, or remote from, the pipeline to be monitored. The host node includes an optical source for generating optical signals, an optical receiver, and a fiber optic sensing cable local to the pipeline to be monitored. The fiber optic sensing cable includes at least one sensing zone, the at least one sensing zone being bound by a pair of Fiber Bragg Gratings of the fiber optic sensing cable.

According to another exemplary embodiment of the present invention, a method of operating an optical detection system for monitoring a pipeline is provided. The method includes the steps of: (a) storing a plurality of predetermined characteristics of events to be monitored related to the pipeline using the optical detection system in memory; (b) comparing a detected characteristic obtained from the optical detection system monitoring the pipeline to the plurality of predetermined characteristics stored in memory; and (c) determining if there is an acceptable level of matching between the detected characteristic and at least one of the plurality of predetermined characteristics stored in memory.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

In order to enable detection and classification of events in connection with a pipeline to be monitored, it is desirable to have a high fidelity electronic representation of a disturbance (e.g., mechanical vibration, acoustic vibration, impact, intrusion, etc.). According to certain exemplary embodiments of the present invention, an optical detection system for use in monitoring a pipeline is provided which utilizes interferometers with high linearity and dynamic range (e.g., certain linearized Sagnac interferometers). The optical detection systems may also include a low noise, low distortion, optical receiver.

In certain more specific exemplary embodiments of the present invention, optical detection systems utilizing an integrated sensor array (e.g., including a sensing cable divided into sensing zones which may be arranged to include a series of linearized Sagnac interferometers) for monitoring a pipeline are provided. Such optical detection systems may include a host node including an interrogation sub-system and a signal processor.

Figure 1A:
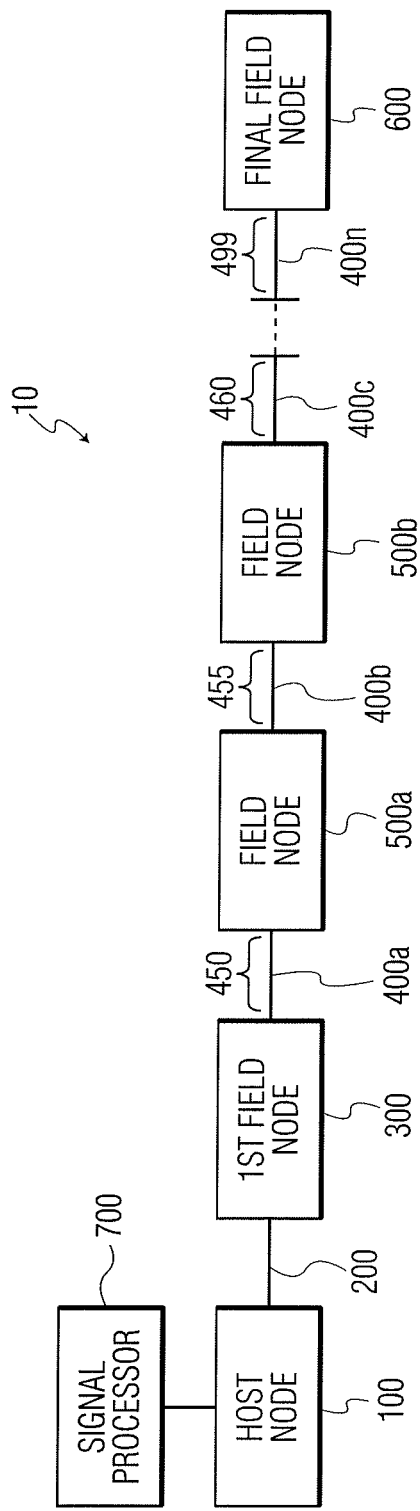
FIG. 1A is a block diagram illustrating an optical detection system in accordance with an exemplary embodiment of the present invention.

Referring now to the drawings, in which like reference numbers refer to like elements throughout the various figures that comprise the drawings, FIG. 1A illustrates an optical detection system 10. Optical detection system 10 includes a plurality of fiber optic cables (i.e., optical sensing cables) 400a, 400b, 400c . . . , 400n which may be termed transducers) configured into separate sensing zones 450, 455, 460 . . . , 499. Optical detection system 10 also includes a plurality of field nodes including a first field node 300; intermediate field nodes 500a, 500b, etc.; and a final field node 600. Optical detection system 10 also includes a lead cable 200 (e.g., a lead cable for telemetry of probe and return signals from each of the zones, a length of such lead cable being application dependent, with an exemplary lead cable being on the order of meters to kilometers in length), a host node 100, and a signal processor 700. In the example shown in FIG. 1A, the optical detection system 10 includes a single host node 100, and a single first field node 300. Depending on the exact configuration of the optical detection system 10 (e.g., the number of sensing zones, the length of the cables covering each of the sensing zones, etc.), there may be a plurality of host nodes, first field nodes, etc., as is desired in the given application.

An exemplary operation of the configuration illustrated in FIG. 1A may be summarized as follows. Host node 100 (which works in conjunction with signal processor 700) generates optical signals and transmits the signals along lead cable 200 to first field node 300 (e.g., where the elements and configuration of the optical detection system, including lead cable 200, may be selected to minimize the lead cable sensitivity to vibration). As will be detailed below, part of the optical signals from host node 100 (intended for use in monitoring sensing zone 450) are transmitted through first field node 300 and along optical sensing cable 400a, are reflected back after reaching intermediate field node 500a, where the reflected signals return along optical sensing cable 400a and ultimately return to host node 100 and signal processor 700 for processing. Another part of the optical signals from host node 100 (intended for use in monitoring sensing zone 455) is transmitted through first field node 300, along optical sensing cable 400a, through intermediate field node 500a, along optical sensing cable 400b, and is reflected back after reaching intermediate field node 500b, where the reflected signals return along optical sensing cables 400b, 400a, and the signals ultimately return to host node 100 and signal processor 700 for processing. A similar process occurs for each subsequent sensing zone. As is clear in FIG. 1A, any number of desired subsequent sensing zones are contemplated (as indicated by the dotted line between zones 460 and 499), with the final sensing zone 499 terminating with final field node 600.

Figure 1B:
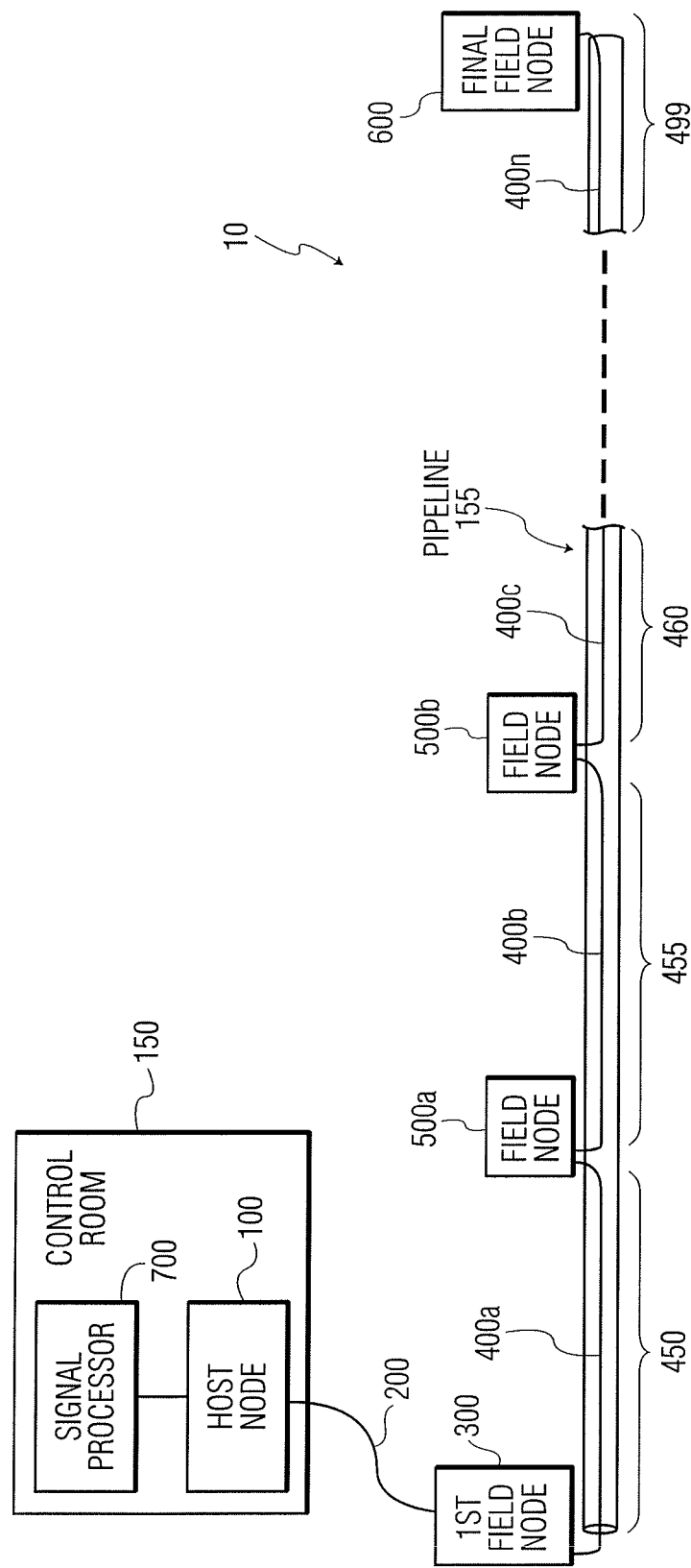
FIG. 1B is a block diagram illustrating the optical detection system of FIG. 1A used in connection with a pipeline monitoring system in accordance with an exemplary embodiment of the present invention.

FIG. 1B illustrates optical detection system 10 used to sense disturbances (e.g., leaks, tampering events, etc.) along a pipeline 155, where each sensing zone 450, 455, 460 . . . 499 corresponds to a given length of pipeline 155. The optical sensing cables 400a, 400b, 400c . . . , 400n are secured to pipeline 155; however, the optical sensing cables may also be provided in close proximity to pipeline 155 without being secured thereto. In FIG. 1B, host node 100 and signal processor 700 are housed in a control room 150 or other desirable environment (e.g., a remote, stable environment). As in FIG. 1A, fiber optic lead cable 200 runs from host node 100 to first field node 300.

Figure 2:
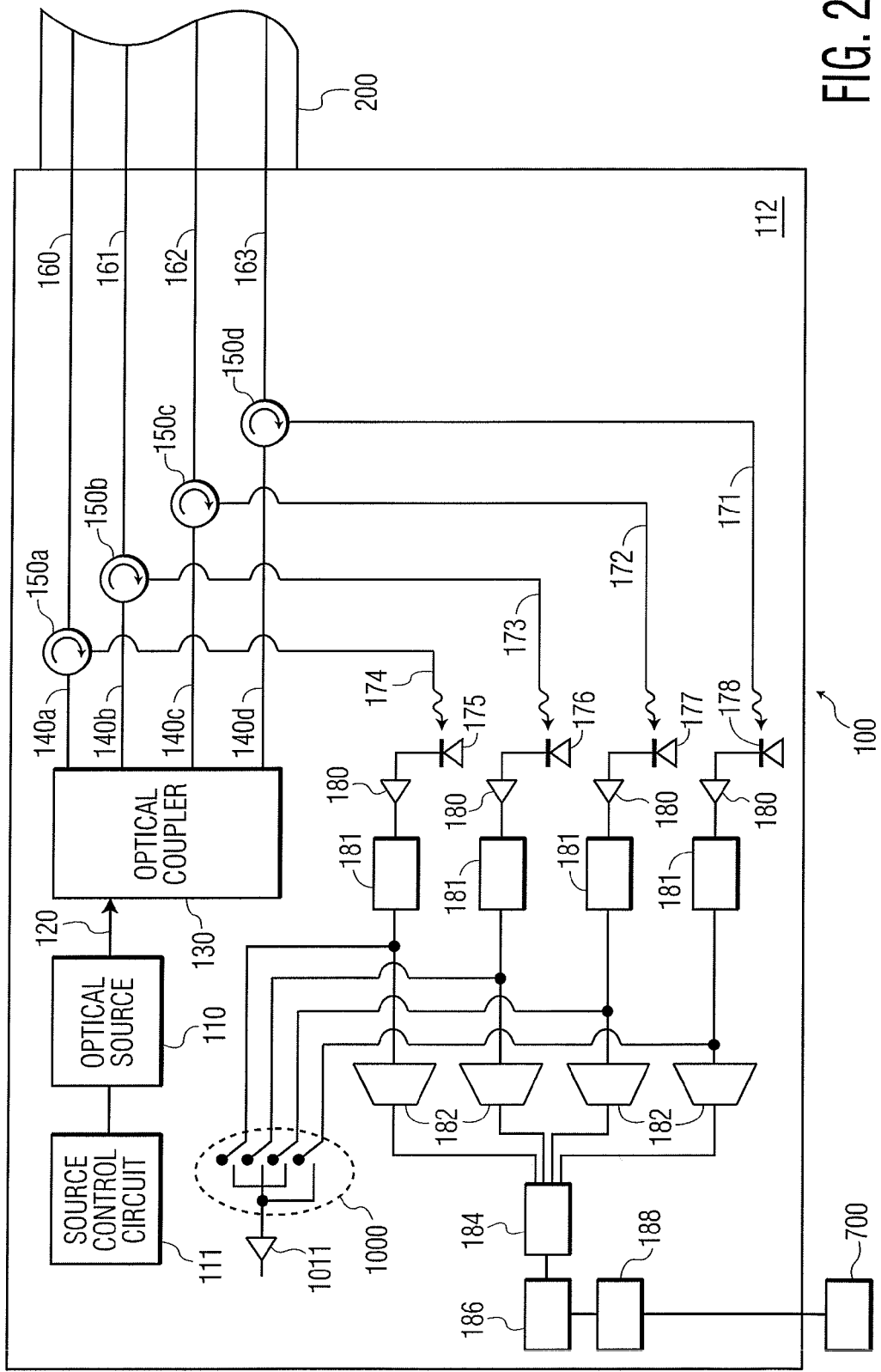
FIG. 2 is a block diagram of a host node of an optical detection system in accordance with an exemplary embodiment of the present invention.

Details of the elements of an exemplary optical detection system 10 are now described. Referring to FIG. 2, host node 100 includes one or more optical sources 110 (e.g., LED sources such as superluminescent light emitting diodes, edge emitting light emitting diodes, other light emitting diode sources, lasers, etc.) within an enclosure 112. According to an exemplary embodiment of the present invention, optical source 110 may be a broadband optical source operated in a continuous wave (CW) mode. Optical source 110 is controlled by a source control circuit 111. In the exemplary embodiment now described (described and illustrated in connection with four sensing zones), optical source 110 is connected via an optical cable 120 to a 1×4 splitter (such as a 1×4 or 4×4 fiber optic coupler or an integrated optic splitter) labeled as optical coupler 130. Optical coupler 130 divides the light intensity output from optical source 110 into four signals along respective fibers 140a, 140b, 140c, and 140d (e.g., four substantially equal intensity signals) that are each output to a respective input lead of a corresponding optical circulator 150a, 150b, 150c, and 150d (e.g., identical optical circulators 150a, 150b, 150c, and 150d). Output signals are provided along each of fibers 160, 161, 162, 163 within fiber optic lead cable 200 from a respective one of optical circulators 150a, 150b, 150c, and 150d.

As provided above, according to certain exemplary embodiments of the present invention, linearized Sagnac interferometers are utilized. As will be appreciated by one skilled in the art, in order to provide a linearized Sagnac interferometer, the architecture of a traditional loop configuration Sagnac interferometer (e.g., typically used to sense rotation) is modified (e.g., folded) to allow measurements of phase perturbations along an optical fiber in a non-looped configuration, for example, by incorporation of a 1×2 fiber optic coupler. Referring again to FIG. 2 (and FIG. 3), light output from host node 100 travels along each of fibers 160, 161, 162, and 163 within lead cable 200 which is connected to first field node 300. First field node 300 includes an enclosure 310 which houses a series of components.

Figure 3:
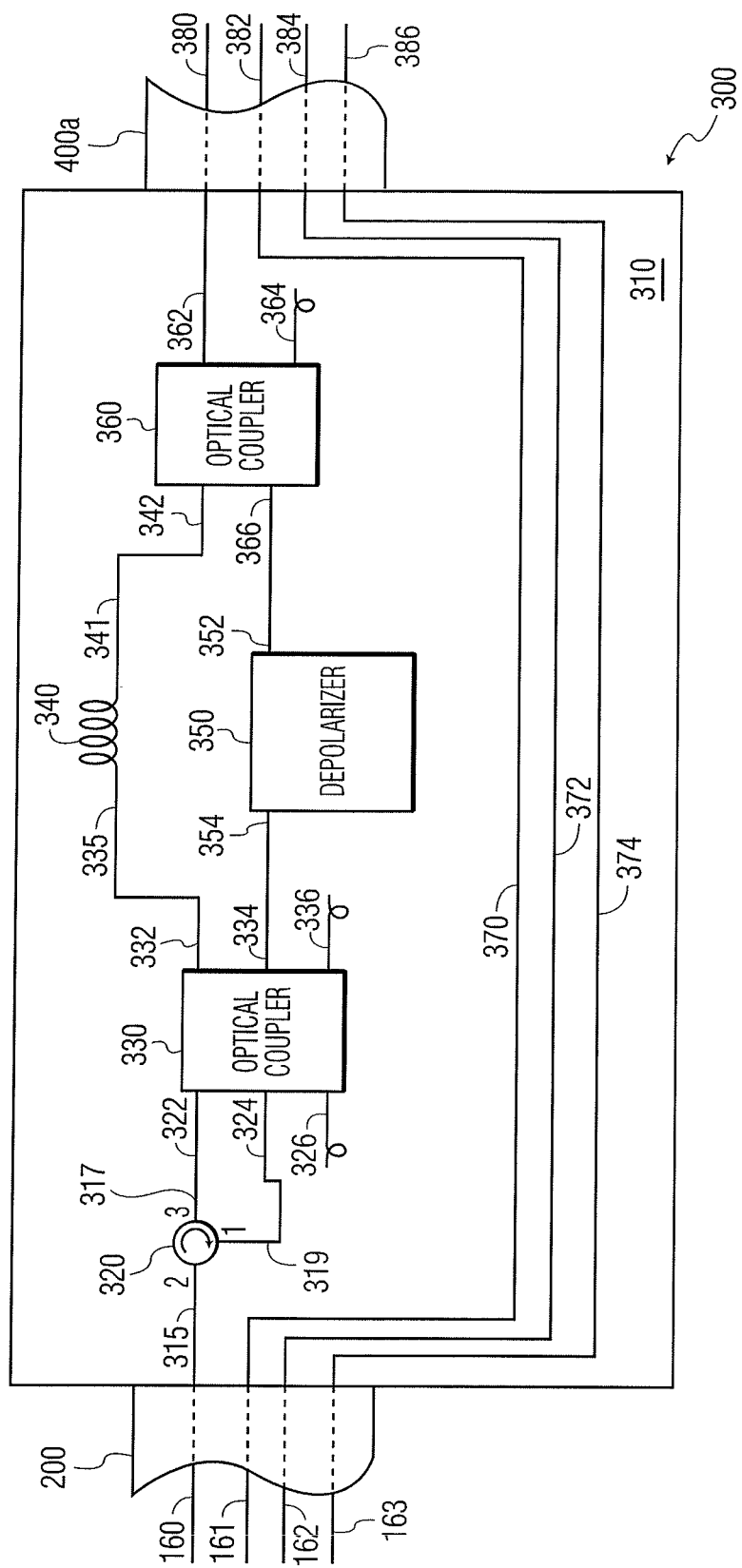
FIG. 3 is a block diagram of a first field node of an optical detection system in accordance with an exemplary embodiment of the present invention.

In FIG. 3, fiber 160 is connected to an input/output lead 315 of an optical circulator 320. A lead 317 of optical circulator 320 is connected to a lead 322 of an optical coupler 330 (e.g., a 3×3 fiber optic coupler 330). A lead 319 of optical circulator 320 is connected to a lead 324 of optical coupler 330.

A lead 332 of optical coupler 330 is connected to a lead 335 of a delay coil 340. The fiber optic delay coil 340 has a length of, for example, at least twice the length of the zone 450 of an optical fiber 380 in optical sensing cable 400a where the midpoint of the sensing loop (e.g., from one output leg of the 3×3 coupler to another) including the sensing optical fiber 380 "unfolded" is within the enclosure 310 for maximum sensitivity. A lead 341 of delay coil 340 is connected to a lead 342 of an optical coupler 360 (e.g., a 2×2 fiber optical coupler 360).

A lead 334 of optical coupler 330 is connected to a lead 354 of a depolarizer 350. A lead 326 of optical coupler 330 is tied off and/or the end crushed to minimize light that is reflected back into optical coupler 330. Similarly, a lead 336 of optical coupler 330 is tied off and/or the end crushed to minimize light that is reflected back into optical coupler 330.

Depolarizer 350 significantly reduces polarization-induced signal fading, allowing inexpensive single mode fiber to be used for all of the optical components and cable fibers rather than costly polarization-maintaining fiber. Depolarizer 350 may be one of several commercially available depolarizers, such as, for example, a recirculating coupler (single or multiple stage) or a Lyot Depolarizer. A lead 352 of depolarizer 350 is connected to a lead 366 of optical coupler 360. A lead 362 of optical coupler 360 is connected to fiber 380 in optical sensing cable 400a. A lead 364 of optical coupler 360 is tied off and/or the end crushed to minimize light that is reflected back into optical coupler 360. Although one example for optical coupler 360 is a 2×2 fiber optic coupler, optical coupler 360 is not limited to that embodiment. For example, a 1×2 fiber optic coupler may be used instead of a 2×2 fiber optic coupler 360, thereby obviating the tying off of second output lead 364.

Fibers 161, 162, and 163 in lead cable 200 are connected to fibers 370, 372, and 374 in field node 300, respectively. These are pass-through fibers not actively used in first field node 300, but rather to be used in connection with sensing in other nodes. Fibers 370, 372, and 374 are connected to fibers 382, 384, and 386 in optical sensing cable 400a, respectively. Fiber 380 in optical sensing cable 400a is used for sensing within zone 450. Fiber 380 in optical sensing cable 400a (which had been used for sensing in zone 450) is attached to a fiber 580 in intermediate field node 500a (see FIG. 4). Fiber 580 is connected to a reflector 581 (e.g., broadband reflector 581). Disturbances along sensing cable 400a cause small changes in the length of fiber 380. These changes cause non-reciprocal changes in the phase of the light travelling through the Sagnac interferometer.

An exemplary operation of first field node 300 shown in FIG. 3 (and partially in FIG. 4) is now provided. An optical signal (i.e., light from host node 100 entering first field node 300) propagates along fiber 160 to lead 315 and enters port 2 of optical circulator 320, and then exits port 3 of optical circulator 320 through lead 317, and then propagates along lead 322 (a length of optical fiber) to optical coupler 330. Optical coupler 330 divides the light into optical signals along two counterpropagating paths: a first path of the divided light extends from lead 332 to delay coil 340 along lead 335, and then from lead 341 to optical coupler 360 through lead 342; a second path of the divided light extends from lead 334 to depolarizer 350 through lead 354, and then from lead 352 to optical coupler 360 through lead 366. Thus, the light along the first path is delayed with respect to the light along the second path by a time approximately proportional to the length of delay coil 340. The two counterpropagating optical signals recombine at optical coupler 360, and the recombined optical signal exits optical coupler 360 along lead 362, and then travels along fiber 380 (for sensing within zone 450) of optical sensing cable 400a. The recombined optical signal enters field node 500a on fiber 380, and propagates along lead 580 to reflector 581, and is then reflected back along fiber 380 to first field node 300. This reflected signal is divided into two optical signals by optical coupler 360, where each of the optical signals travels along a counterpropagating path and recombines coherently at optical coupler 330. The result of the optical signals recombining at optical coupler 330 is that the recombined light has an intensity output proportional to the phase perturbation from the original disturbance along fiber 380 within optical sensing cable 400a. This optical signal (having a variable intensity) is output from optical coupler 330 along lead 324 (i.e., fiber 324) and then along lead 319 into port 1 of optical circulator 320. This optical signal propagates from port 1 to port 2 of optical circulator 320, and then along lead 315 to fiber 160 of lead cable 200. The signal is transmitted along fiber 160 of lead cable 200 to the interrogator of host node 100.

Figure 4:
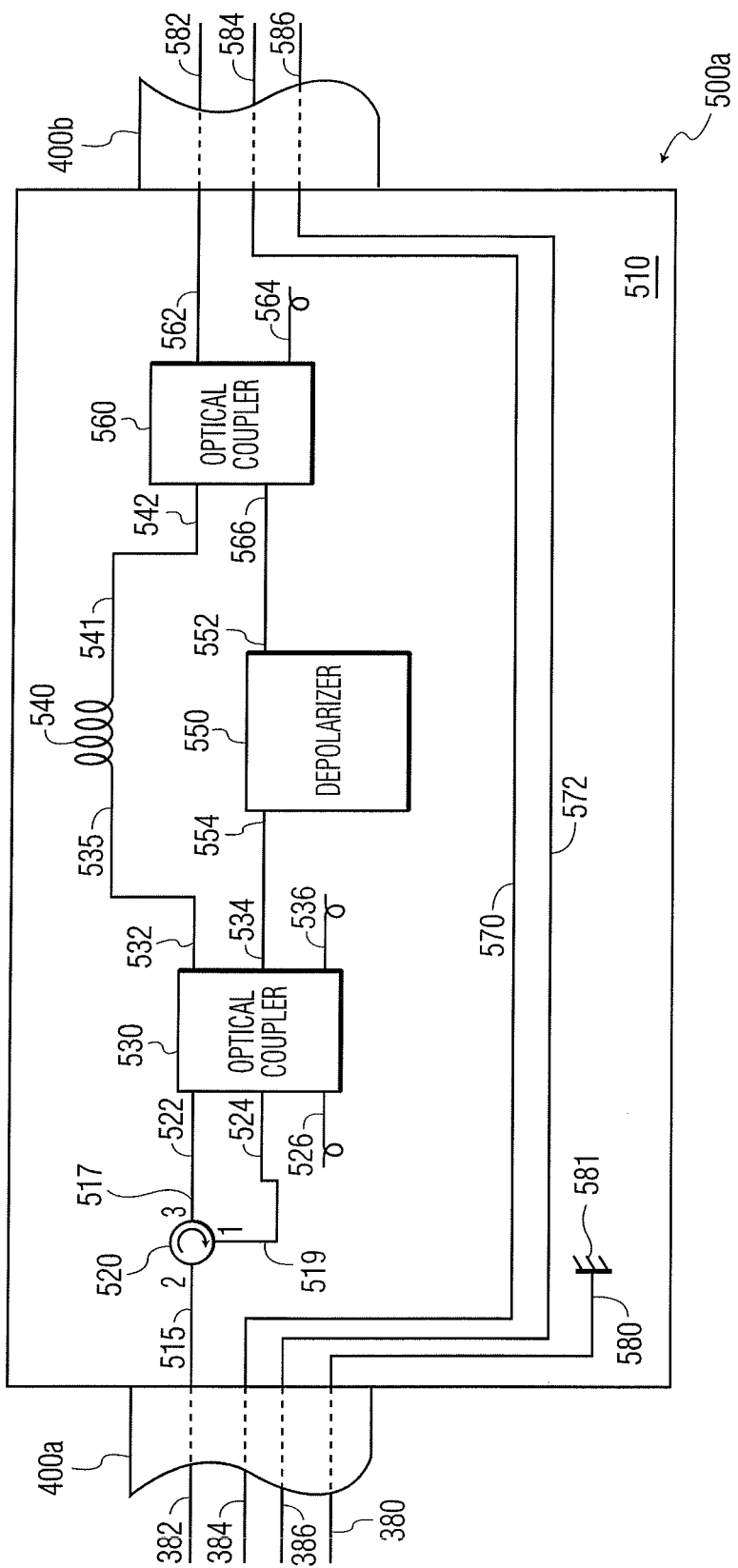
FIG. 4 is a block diagram of an intermediate field node of an optical detection system in accordance with an exemplary embodiment of the present invention.

Referring now to FIG. 4, fibers 384 and 386 in optical sensing cable 400a are connected to fibers 570, 572 in intermediate field node 500a, respectively. These are pass-through fibers not actively used in intermediate field node 500a, but rather to be used in connection with sensing in other nodes. Fibers 570, 572 are connected to fibers 584, 586 in optical sensing cable 400b, respectively. Fiber 582 in optical sensing cable 400b is used for sensing within zone 455.

Fiber 382 from optical sensing cable 400a is connected to an input/output lead 515 of an optical circulator 520. The lead 517 of optical circulator 520 is connected to a lead 522 of an optical coupler 530 (e.g., a 3×3 fiber optic coupler 530). A lead 519 of optical circulator 520 is connected to a lead 524 of optical coupler 530.

A lead 532 of optical coupler 530 is connected to lead 535 of a delay coil 540. The fiber optic delay coil 540 has a length of, for example, at least twice the length of the zone 455 of optical fiber 582 in fiber optic sensing cable 400b where the midpoint of the sensing loop (e.g., from one output leg of the 3×3 coupler to another), including the sensing optical fiber 582 "unfolded" is within the enclosure 510 for maximum sensitivity. A lead 541 of delay coil 540 is connected to a lead 542 of an optical coupler 560 (e.g., a 2×2 fiber optic coupler 560).

A lead 534 of optical coupler 530 is connected to a lead 554 of a depolarizer 550. A lead 526 of optical coupler 530 is tied off and/or the end crushed to minimize light that is reflected back into optical coupler 530. Similarly, a lead 536 of optical coupler 530 is tied off and/or the end crushed to minimize light that is reflected back into optical coupler 530. A lead 552 of depolarizer 550 is connected to a lead 566 of optical coupler 560. A lead 562 of optical coupler 560 is connected to fiber 582 in optical sensing cable 400b. A lead 564 of optical coupler 560 is tied off and/or the end crushed to minimize light that is reflected back into optical coupler 560. Although an exemplary optical coupler 560 is a 2×2 fiber optic coupler, the optical coupler 560 is not limited to that embodiment. For example, a 1×2 fiber optic coupler may be used instead of a 2×2 fiber optic coupler 560, thereby obviating the tying off of lead 564.

An exemplary operation of field node 500a shown in FIG. 4 is now provided. An optical signal (i.e., light from host node 100 entering field node 500a) propagates along fiber 382 to lead 515 and enters port 2 of optical circulator 520, and then exits port 3 of optical circulator 520 through lead 517, and then propagates along lead 522 (a length of optical fiber) to optical coupler 530. Optical coupler 530 divides the light into optical signals along two counterpropagating paths: a first path of the divided light extends from lead 532 to delay coil 540 along lead 535, and then from lead 541 to optical coupler 560 through lead 542; a second path of the divided light extends from lead 534 to depolarizer 550 through lead 554, and then from lead 552 to optical coupler 560 through lead 566. Thus, the light along the first path is delayed with respect to the light along the second path by a time approximately proportional to the length of delay coil 540. The two counterpropagating optical signals recombine at optical coupler 560, and the recombined optical signal exits optical coupler 560 along lead 562, and then travels along fiber 582 (for sensing within zone 455) of optical sensing cable 400b. The recombined optical signal enters field node 500*b* (see FIGS. 1A-1G) on fiber 582, and is reflected back (using a reflector in field node 500*b* similar to reflector 581 in field node 500*a*) along fiber 582 to field node 500*a*. This reflected signal is divided into two optical signals by optical coupler 560, where each of the optical signals travels along a counterpropagating path and recombines coherently at optical coupler 530. The result of the optical signals recombining at optical coupler 530 is that the recombined light has an intensity output proportional to the phase perturbation from the original disturbance along fiber 582 within optical sensing cable 400*b*. This optical signal (having a variable intensity) is output from optical coupler 530 along lead 524 (i.e., fiber 524) and then along lead 519 into port 1 of optical circulator 520. This optical signal propagates from port 1 to port 2 of optical circulator 520, and then along lead 515 to fiber 382 (and pass through fiber 370) to fiber 161 of lead cable 200. The signal is transmitted along fiber 161 of lead cable 200 to the interrogator of host node 100.

Figure 5:
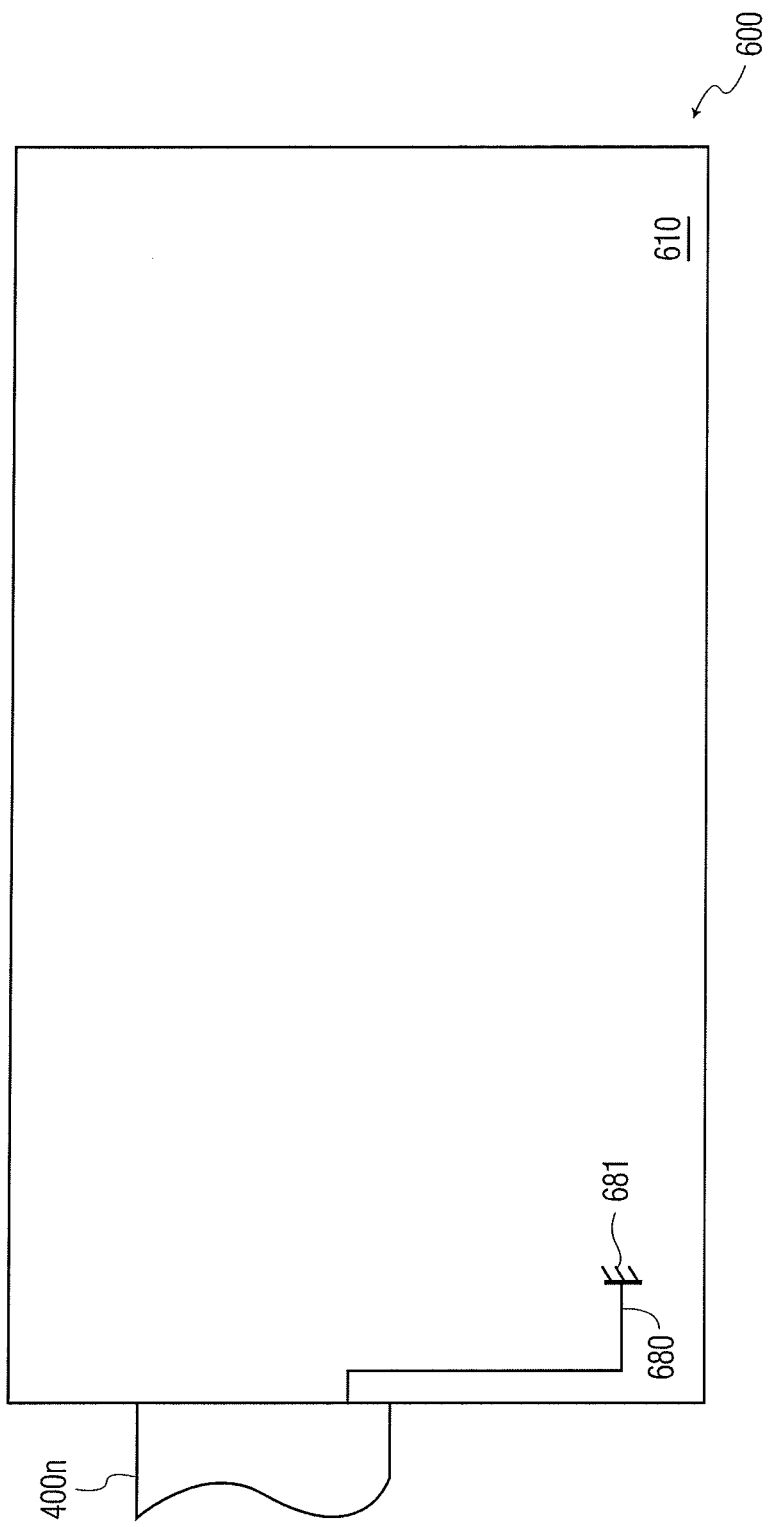
FIG. 5 is a block diagram of a final field node of an optical detection system in accordance with an exemplary embodiment of the present invention.

The pattern of field nodes 500*a*, 500*b*, etc. and optical sensing cables 400*a*, 400*b*, etc. is repeated, as desired, and utilizing the number of available optical fibers within the cable. Other system level topologies (e.g., branching, bi-directional/redundancy, etc.) are contemplated using this modular approach. Each optical sensing cable 400*a*, 400*b*, etc. may be used to provide an acoustically independent sensing zone. FIG. 5 illustrates final field node 600 including an enclosure 610 for receiving final optical sensing cable 400*n*. Optical sensing cable 400*n* includes a fiber 680 which is connected to a reflector 681 (e.g., broadband reflector 681).

Referring back to FIG. 2, optical intensity signals proportional to the phase perturbations within each zone (e.g., due to mechanical or acoustic vibrations sensed) are returned to host node 100 (which may be considered an interrogator) by way of fibers 160, 161, 162, and 163 and then through circulators 150*a*, 150*b*, 150*c*, and 150*d* after conversion from a phase signal to an intensity signal at coupler 330 or 530, etc. Circulators 150*a*, 150*b*, 150*c*, and 150*d* are configured to behave in such as way as to allow signals from fiber 160 to pass through to a fiber 174, for signals from fiber 161 to pass through to a fiber 173, for signals from fiber 162 to pass through to a fiber 172, and for signals from fiber 163 to pass through to a fiber 171. However, the circulators 150*a*, 150*b*, 150*c*, and 150*d* prevent light from passing from: fiber 160 or fiber 174 to fiber 140*a*; fiber 161 or fiber 173 to fiber 140*b*; fiber 162 or fiber 172 to fiber 140*c*; and fiber 163 or fiber 171 to fiber 140*d*, etc. Light from fiber 174 is converted to an electrical current signal at a photodetector 175. Likewise, light from fiber 173 is converted to an electrical current signal at a photodetector 176, light from fiber 172 is converted to an electrical current signal at a photodetector 177, and light from fiber 171 is converted to an electrical signal at a photodetector 178. The electrical signals converted by photodetectors 175, 176, 177, and 178 may be very low noise signals, with dark current less than about 0.5 nA.

The outputs of photodetectors 175, 176, 177, and 178 are then amplified using transimpedance amplifiers 180 (e.g., amplifiers of very low distortion (less than −90 dB), high gain bandwidth (on the order of 500-2,000 MHz), and noise less than 1 nV/√Hz (such as the model AD8099, produced by Analog Devices, Inc.)). Multiple stages of further amplification may follow each transimpedance amplifier 180 as is known by those skilled in the state of the art. The electrical outputs of amplifiers 180 are filtered using filters 181. Use of high quality photodetectors, amplifiers, and filters desirably produces signals with fidelity sufficient for advanced signal processing desired for robust classification of detected events and alarm generation (or other indications based on mechanical/acoustic vibration) without false alarms. The signals output from filters 181 are sampled by A/D converters (ADCs) 182. The sampled electrical signals from ADCs 182 are received by one or more Field Programmable Gate Arrays (FPGAs) 184.

FPGAs 184 may be configured to perform high speed signal pre-processing. Such FPGAs 184 are typically used to perform filtering and Fast Fourier Transforms (FFTs) of the sampled data from each zone to determine the instantaneous spectrum of the disturbance(s) along each zone. Further processing is performed by a microprocessor 186 as shown in FIG. 2. Communication with outside security system processors and other peripheral devices is accomplished with an interface chip 188. Interface chip 188 may be for example, an RS-232 interface chip or a USB transceiver.

An exemplary signal processing sequence is accomplished as follows. From each sensing zone (e.g., zone 450, zone 455, zone 460, etc.), ADCs 182 digitize a set of data samples (e.g., at an exemplary rate of 8192 samples per second). In such an example, FPGA 184 performs a 8192 sample FFT to produce spectra, which are output to the microprocessor 186. Microprocessor 186 groups the spectra output from FPGA 184 into data windows (e.g., on the order of 0.25 seconds).

In such an example, a series of spectral masks are created by processing signals generated during the introduction of known events (where such events may be configured depending upon the application). In a pipeline detection application such an event may be a hostile/alarm event such as drilling of a portion of the pipeline, cutting of a portion of the pipeline, fluid leakage from a portion of the pipeline, etc. Spectra generated by FPGA 184 during these events are saved, for example, in a database, a look-up table, or other data storage techniques. Each of these spectral masks is further modified to create a dynamic signal threshold. The spectrum of the received data within each data window is compared to the signal thresholds. A persistence requirement is established that requires "m" spectra to exceed a spectral mask for every "n" contiguous time windows which, when true, is reported as an alarm condition. The use of persistence helps minimize false alarms due to instantaneous (non-alarm) events of high energy.

The dynamic threshold is continually updated wherein a single value is calculated for each frequency band within a spectrum by summing the values of a common frequency band from all of the zones in an environmental zone (where the environmental zone is a set of real sensing zones artificially grouped by the user). These values are integrated over a user-defined time span. This dynamic threshold is used to compensate for non-instantaneous environmental effects impacting multiple zones (e.g., lasting on the order of seconds to hours), such as rain, hail, highway traffic, trains, etc. The shorter this time span of the dynamic threshold integration, the more rapidly the dynamic threshold changes. The longer this time span, the more the dynamic threshold response is damped. In addition, the amount that any one instantaneous spectrum can bias the dynamic threshold can also be limited to prevent single events (such as an impact from a falling tree branch) from having an undue impact upon the threshold.

Electrical outputs from filters 181 in host node 100 may be combined and distinguished by use of a multiplexer, switch, or other appropriate mechanism 1000 to an amplifier or line driver 1011 to provide an audio output of any zone desired by a user. Providing an audible output enhances the functionality of optical detection system 10 by enabling the user to hear the detected events as alarms are generated.

The optical detection system 10 shown in FIGS. 1A-1B relates to a linearized Sagnac type of architecture; however, the present invention is not limited to such an architecture. Examples of alternative architectures are a Time Division Multiplexing (TDM) system optical architecture such as that shown in FIG. 6, and a Michelsen optical architecture such as that shown in FIGS. 7A-7B.

Figure 6:
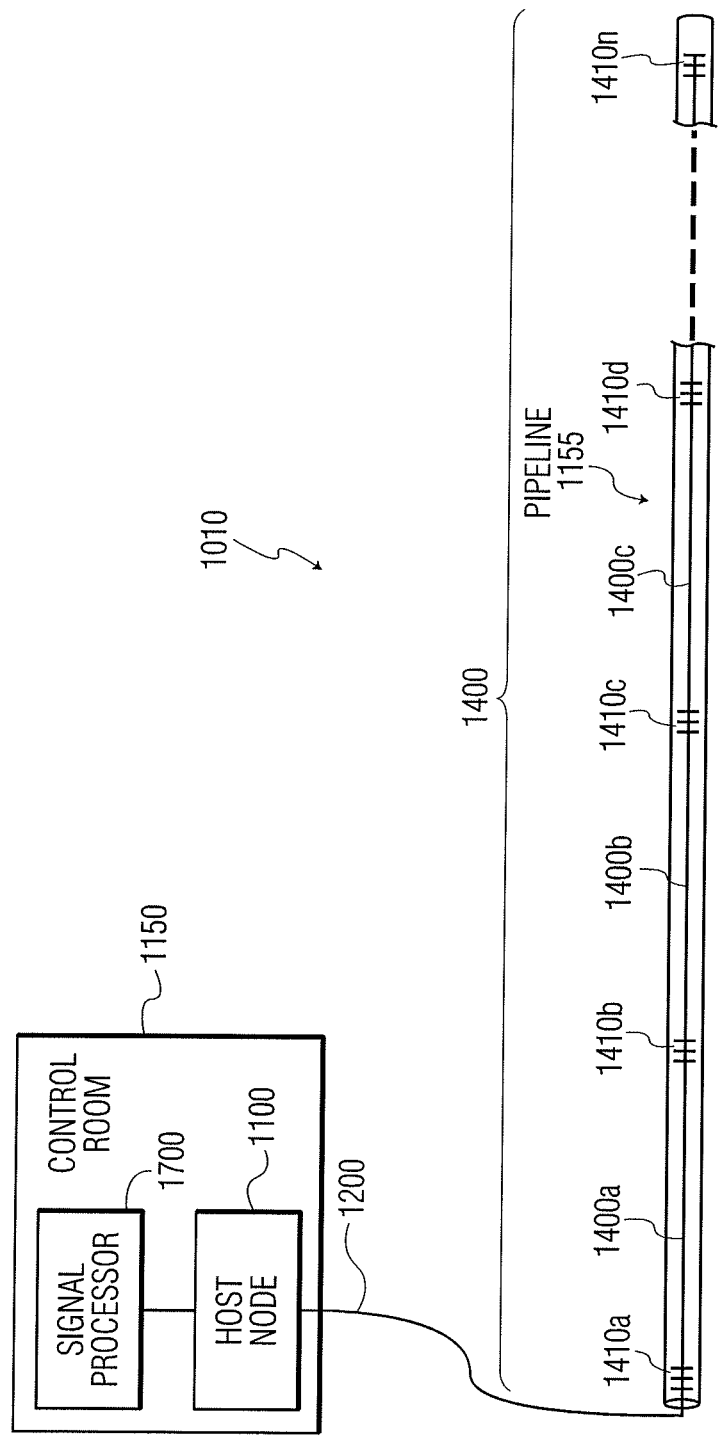
FIG. 6 is a block diagram illustrating an optical detection system for pipeline monitoring in accordance with an exemplary embodiment of the present invention.

Referring specifically to FIG. 6, an optical detection system 1010, configured as an infinite impulse response interferometer array, is provided for monitoring a pipeline 1155. The functions of various of the elements described in connection with FIG. 6 are similar to those described above in connection with FIGS. 1A-1B. A control room 1150 includes a host node 1100 (including an interrogator) and a signal processor 1700. Host node 1100 is connected to an optical sensing cable 1400 using a lead cable 1200, where optical sensing cable 1400 extends along pipeline 1155.

Optical sensing cable 1400 contains a series of interferometers (e.g., Fabry-Perot interferometers) that are each a segment of an optical fiber of optical sensing cable 1400. An exemplary length of a segment (which may be termed a sensing zone) is between 25-1000 meters. The interferometers are bounded by a pair of Fiber Bragg Gratings (FBGs). More specifically, a segment 1400$a$ is bounded by FBGs 1410$a$, 1410$b$. Likewise, a segment 1400$b$ is bounded by FBGs 1410$b$, 1410$c$. Likewise, a segment 1400$c$ is bounded by FBGs 1410$c$, 1410$d$, and so on, until the final segment terminates at FBG 1410$n$.

According to an exemplary embodiment of the present invention, each of the FBGs (e.g., 1410$a$, 1410$b$, 1410$c$, 1410$d$, 1410$n$) are periodic perturbations to the crystallographic structure of the fiber. Such perturbations may be created by an interference pattern using a laser beam as is well known by those skilled in the art. Exemplary ones of the FBGs have a peak reflection on the order of one percent, and have a spectral width (full width at half maximum or FWHM) of approximately 4-6 nm. The center wavelength of exemplary FBGs is dependent upon the type of multiplexing used within the system. The purposes of the interrogator (within host node 1100) are to illuminate the array of interferometers (e.g., with very narrow linewidth light, for example, on the order of 0.1-10 kHz FWHM) and to provide an electrical output which is proportional to the acoustic input to each interferometer. An example of such an interrogator, which includes the optical source, is a low phase noise laser such as an external cavity laser or a fiber laser. A phase signal is imposed upon the light (e.g., a phase modulated light signal), which is also pulsed, with pulse widths equal to twice the time for light transiting between adjacent FBGs. The pulses are transmitted to the linear sensor array including the interferometers, where each FBG reflects a small percentage of the light back to the interrogator within host node 1100. More specifically, the interferometers (e.g., the fiber segments bound by a pair of FBG gratings) sense acoustic and/or mechanic vibrations (e.g., an emission from a person tampering with, or adjacent to, pipeline 1155), and after return from the linear sensor array to host node 1100, the phase signals (e.g. optical signals having been perturbed by phase changes caused by vibrations, etc.) are demodulated (e.g., down converted) and available for post processing (e.g., spectral analysis, mask comparison, etc.) by processor 1700 (e.g., a microprocessor, a PC, etc.) where such vibration is processed to interpret the event (e.g., tampering with pipeline 1155).

Figure 7A:
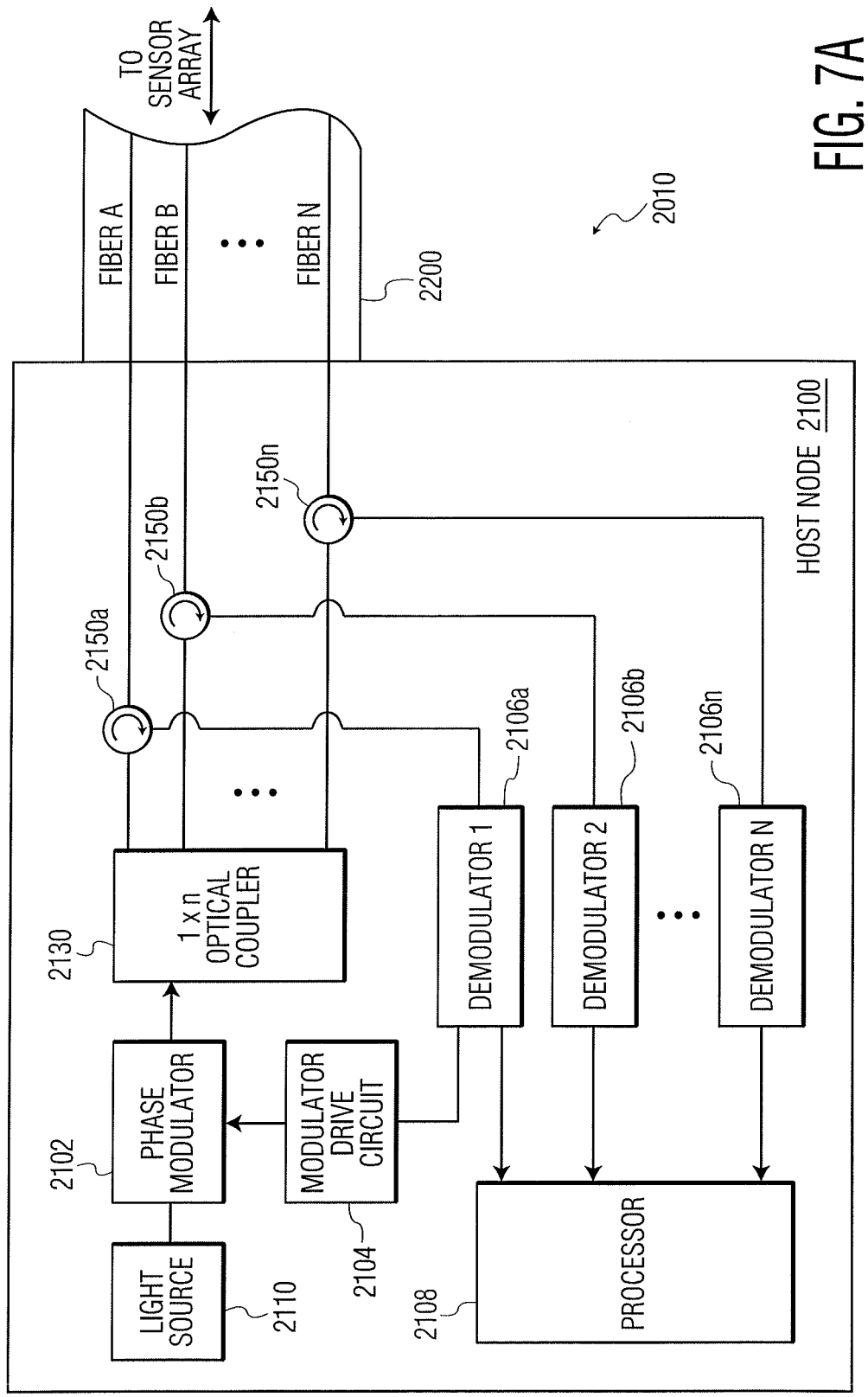
FIGS. 7A-7B are block diagrams illustrating another optical detection system for pipeline monitoring in accordance with another exemplary embodiment of the present invention.
Figure 7B:
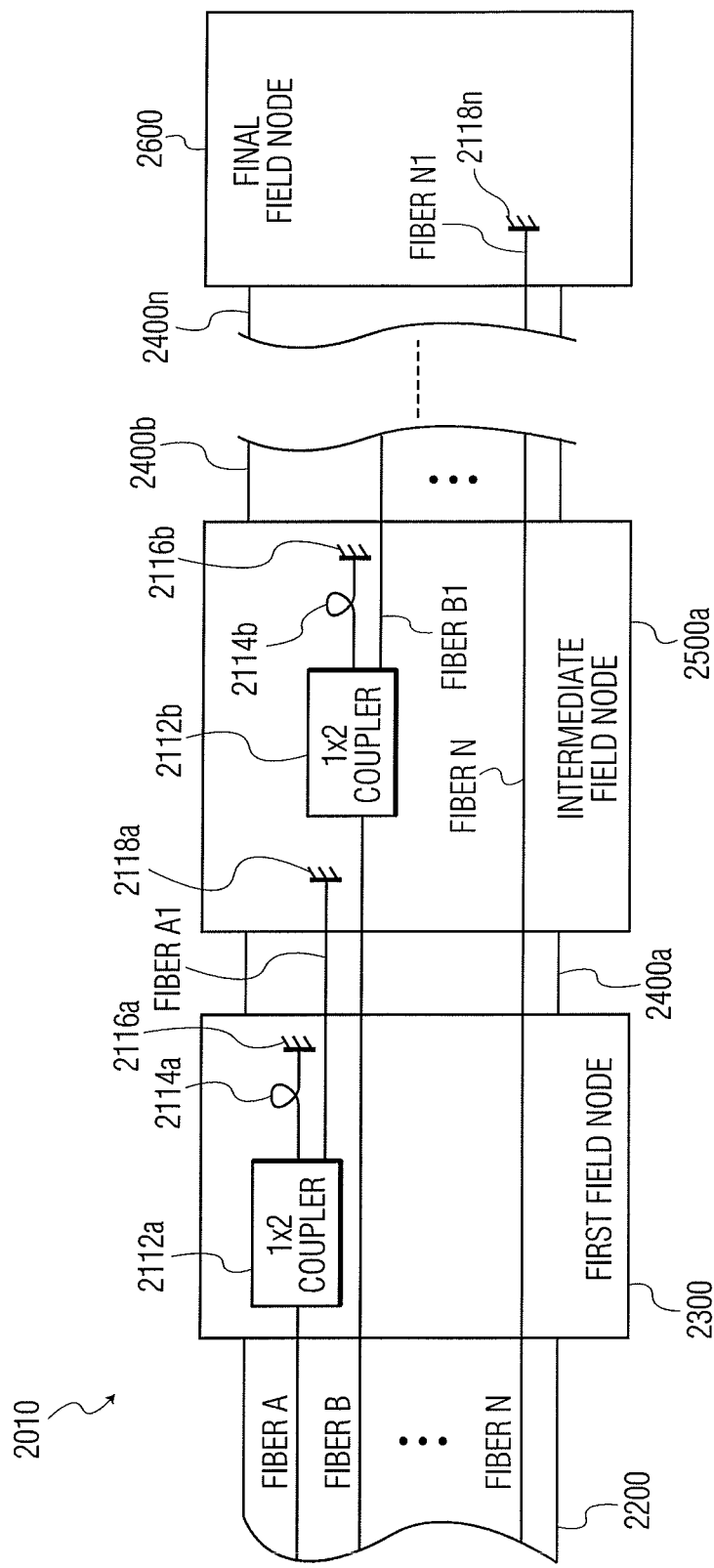

Referring specifically to FIGS. 7A-7B, a host node 2100 of an optical detection system 2010 (where host node 2100 is somewhat analogous in function to host node 100 in FIGS. 1A-1B, and may be provided in a control room or other desirable environment) is connected to an array of sensors for monitoring a pipeline or the like in a Michelson configuration (e.g., where the array of sensors is secured to, or provided in proximity of, a pipeline which is not shown for simplicity). Host node 2100 includes a light source 2110 (e.g., a coherent light source such as a laser light source) which transmits an optical signal (i.e., light) to a phase modulator 2102. A phase carrier (e.g., an electrical signal such as a sine wave) is generated by demodulator 1 (i.e., element 2106$a$), and is further amplified by modulator drive circuit 2104 (e.g., having an output impedance substantially matching that of phase modulator 2102). Phase modulator 2102 may be a fiber-wrapped PZT (i.e., lead zirconate titanate) tube, an electro-optic phase modulator (e.g., a lithium niobate planar waveguide device), or any other suitable device for modulating optical phase.

The amplified phase carrier is output onto the optical signal by phase modulator 2102. The output optical signal from phase modulator 2102 passes through an optical coupler 2130, where optical coupler 2130 is a 1×n optical coupler (e.g., where "n" may be the number of sensors or sensing zones of optical detection system 2010). The optical signal (i.e., light) is divided at optical coupler 2130, and the divided light for each sensing zone passes through a respective optical circulator. More specifically: the optical signal for zone A passes through an optical circulator 2150$a$; the optical signal for zone B passes through an optical circulator 2150$b$; and the optical signal for zone N passes through an optical circulator 2150$n$ (where there may be any of a desired number of zones between zone B and zone N). A lead cable 2200 (carrying fibers A, B, N, etc.) extends from host node 2100 to a first field node 2300. Lead cable 2200 may be desirably insensitive to perturbations like vibration and acoustic energy.

At each field node (i.e., including a first field node 2300, intermediate field nodes 2500$a$, etc.) excluding a final field node 2600, there is an interferometer which extends to the next adjacent field node. Each of the interferometers includes: an optical coupler 2112$a$, 2112$b$, etc., where the optical coupler may be a 1×2 optical coupler, a 2×2 optical coupler, etc.; a respective reference coil 2114$a$, 2114$b$, etc., where an exemplary reference coil may have a length approximately equal to the length of fiber in the sensing zone, and where the reference coil is relatively stable to vibratory and acoustic inputs; a respective optical sensing fiber A1, B1, N1; and a reflector 2116$a$, 2116$b$, etc., where exemplary reflectors include a reflective end face on a fiber or a Faraday Rotator Mirror.

More specifically fiber A extends from optical circulator 2150$a$ to optical coupler 2112$a$ in first field node 2300. An optical signal on fiber A is divided at optical coupler 2112$a$, where a first leg of the divided optical signal travels along reference coil 2114$a$, and then to reflector 2116$a$. The divided optical signal reflects from reflector 2116$a$ back to optical coupler 2112$a$. A second leg of the divided optical signal travels along fiber A1, where fiber A1 acts as the sensing fiber along a first sensing zone of a pipeline (where the pipeline is not shown in FIGS. 7A-7B). Sensing fiber A1 is desirably sensitive to vibratory and acoustic disturbances. More specifically, sensing fiber A1 responds to such disturbances by straining and/or changing its length (e.g., in response to, and at the same frequency as, the disturbance), thereby converting vibration and/or acoustic energy into optical phase information. This optical phase information is mixed with the phase carrier induced from phase modulator 2102 (e.g., on the order of 10-100 kHz). The optical signal containing the phase information travels along fiber A1 (within cable 2400$a$), reflects at reflector 2118$a$, and travels back to optical coupler 2112$a$. The optical signals reflected back along each of the first leg and second leg coherently recombine at optical coupler 2112a (where the phase information from the second leg is converted to optical intensity information at optical coupler 2112a), and the recombined optical signal travels back along fiber A to optical circulator 2150a of host node 2100, and then to demodulator 1.

The optical signal is converted to electrical energy, and is demodulated, at demodulator 1. A processor 2108 processes the electrical signal to determine whether the perturbations and/or disturbances acting on the optical fiber in the first sensing zone are indicative of a predetermined activity on the pipeline (e.g., where such predetermined activity may be a pipeline leak, or a pipeline sabotage such as digging, cutting, drilling, etc.). The determination by processor 2108 may be frequency-based processing, time-based processing, or a combination thereof.

Subsequent sensing zones of the pipeline are monitored in a similar manner (i.e., using respective demodulators 2, N labeled as elements 2106b, 2106n). For example, the second sensing zone of a pipeline is monitored using sensing fiber B1 (within cable 2400b) which extends from (1) optical coupler 2112b within intermediate field node 2500a, to (2) a reflector similar to reflector 2118a in a subsequent intermediate field node that is not shown. Finally, the final sensing zone is monitored using sensing fiber N1 (within cable 2400n, only an end of which is shown in FIG. 7B), where sensing fiber N1 terminates at a reflector 2118n at final field node 2600.

Figure 8:
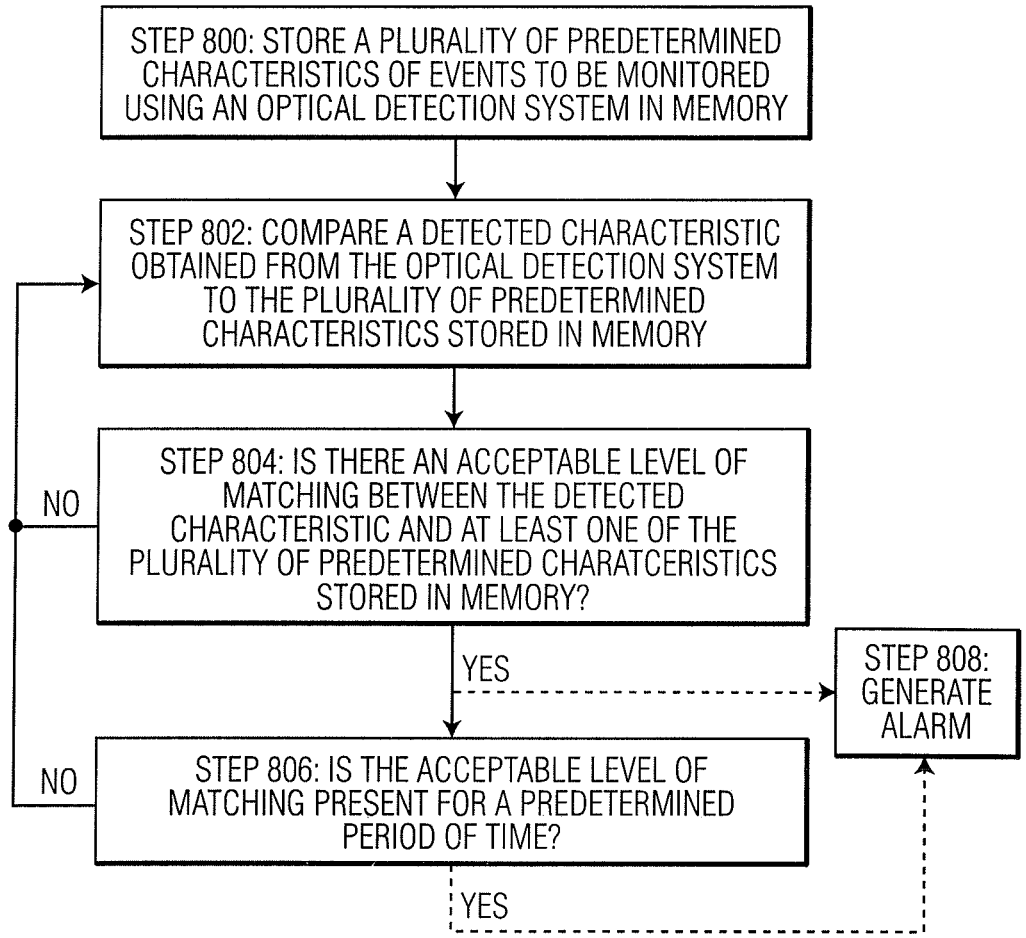
FIG. 8 is a flow diagram illustrating a method of operating an optical detection system for monitoring a pipeline in accordance with an exemplary embodiment of the present invention.

The present invention also includes methods of operating optical detection systems such as the optical detection systems 10 illustrated and described in connection with FIGS. 1A-1B and FIGS. 2-5. FIG. 8 illustrates an example of such a method implemented in a closed-loop fashion. At step 800, a plurality of predetermined characteristics of events to be monitored using an optical detection system are stored in memory. By "predetermined" is meant determined beforehand, so that the predetermined characteristic must be determined, i.e., chosen or at least known, in advance of some event such as implementation of the method. Depending upon the application of the optical detection system, such events (and therefore, the predetermined characteristics of such events) may vary broadly. For example, in an exemplary pipeline detection system, exemplary events may include a pipeline leak, sabotage of a pipeline (e.g., a pipe being cut by a saw, a pipe being struck by an object, a pipe being drilled, etc.), and nuisance alarms (e.g., animals, weather, normal vehicular traffic, etc.). Further still, the characteristics of the events may vary broadly. As provided above, such a characteristic may be spectra or a spectrum of a known event (e.g., a vibration spectra/spectrum of the known event). Such a spectrum may be an energy profile over a plurality of frequencies, etc.

In one specific example, in order to provide the characteristics at step 800, a number of substeps are completed. In a first substep, a windowing function (such as a Hanning function or Beckman function) is applied to a sampled set of data points within a series of time windows during a series of known events (e.g., leaks, hammering, cutting, etc.). In a second substep, a spectrum is created by applying a Fast Fourier Transform (FFT) on the windowed data. In a third substep, the spectrum is scaled in a way to include a population of system responses to a series of similar events (e.g., in such a way as to minimize false alarms) to create a spectral mask. In a fourth substep, the resultant spectral mask is associated with each event and is stored in a data structure (e.g., a database or other similarly retrievable structure).

At step 802, a detected characteristic obtained from the optical detection system (e.g., obtained from the host node by processing of optical intensity information received from the various field nodes) is compared to the plurality of predetermined characteristics stored in memory. Referring again to the spectra example described above, step 802 may include two substeps. In a first substep, windowed samples of data are acquired (e.g., using the optical detection system in a pipeline monitoring application) during normal operation, and spectra of this data are generated as a function of time (e.g., where the spectra may be generated by performing a Fast Fourier Transform on the acquired data over the time window). Then, in a second substep, the spectra generated during normal operation are compared to those previously associated with alarm events (and nuisance events) and stored (e.g., compared to the characteristic provided in step 800).

At step 804, a determination is made as to whether there is an acceptable level of matching between the detected characteristic from step 802 and at least one of the plurality of predetermined characteristics stored in memory in step 800. If there is no such acceptable level of matching (i.e., a "No" answer at step 604), then the process returns to step 802 and further comparisons are made with updated data. If there is such an acceptable level of matching (i.e., a "Yes" answer at step 804) then an alarm may be generated at step 808.

As will be appreciated by those skilled in the art, certain types of events may be of a momentary nature, and a momentary match (i.e., a momentary acceptable level of matching at step 804) may suffice to generate an alarm at step 808. However, other types of events may be of such a type where it is appropriate to confirm that the event continues for a predetermined period of time. In such a case, even if there is such an acceptable level of matching (i.e., a "Yes" answer at step 804) at step 802, the process may not immediately generate an alarm, but rather may proceed to step 806 where a determination is made as to whether the acceptable level of matching is present for a predetermined period of time (e.g., or apply a persistence test to the processed operational data to see if it exceeds an alarm threshold, where such threshold may be the predetermined period of time, or some other threshold). If the answer at step 806 is "Yes," then an alarm is generated at step 808. If the answer at step 806 is "No," then the process proceeds to step 802 for continued monitoring. The step 806 of determining if the acceptable level of matching is present for a predetermined period of time can be accomplished in a closed loop fashion wherein a counter is updated for each incremental time period during which there is an acceptable level of matching.

Although the present invention has been described in connection with pipeline monitoring, the teachings of the present invention may be applied to any of a number of applications as desired by the user.

The optical fibers and cables illustrated and described herein may be arranged in any desired configuration. For example, each of the fibers may be provided in a single length between elements, or in multiple lengths, as desired. In a specific example, fiber 160 in FIG. 3 connects to port 2 of optical circulator 320 through lead 315; however, it is understood that lead 315 may be part of fiber 160 if desired. Likewise, port 3 of optical circulator 320 and optical coupler 330 are connected through leads 317 and 322; however, it is understood that leads 317 and 322 may be part of the same length of optical fiber if desired.

Although the present invention has been described in connection with certain exemplary elements (e.g., the elements illustrated and described in connection with FIGS. 2-7A,B) it is not limited to those elements. The optical detection system may use any of a number of types of components within the scope and spirit of the claims.

Although the present invention has primarily been described in connection with lengths of optical sensing cable 400a, 400b, etc. sensing disturbances (e.g., as in FIGS. 1A-1B), the present invention is not limited to such embodiments. For example, one or more point sensing transducers may be integrated into each of the sensing zones. Such point sensing transducers may be used to sense a disturbance at a specific "point" along a sensing cable segment as opposed to general sensing anywhere along the sensing cable segment. Further, such point sensing transducers may include elements or structure distinct from (and in addition to) the sensing cable segment.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An optical detection system for monitoring a pipeline, the optical detection system comprising:
   (a) a host node in the vicinity of, or remote from, a pipeline to be monitored, the host node including (a) an optical source for generating optical signals, and (b) an optical receiver; and
   (b) a plurality of fiber optic sensors local to the pipeline to be monitored, the plurality of fiber optic sensors for converting at least one of vibrational and acoustical energy to optical intensity information, each of the fiber optic sensors including: (1) at least one length of optical fiber configured to sense at least one of vibrational and acoustical energy; (2) a reflector at an end of the at least one length of optical fiber; and (3) at least one field node for receiving optical signals from the host node, the field node transmitting optical signals along the at least one length of optical fiber, the field node receiving optical signals back from the at least one length of optical fiber, and the field node transmitting optical signals to the optical receiver of the host node,
   wherein each of the fiber optic sensors includes a linearized Sagnac interferometer, wherein the linearized Sagnac interferometer includes a 3×3 fiber optic coupler, a delay coil of optical fiber, a depolarizer, and a 2×2 fiber optic coupler,
   wherein an output of the optical source is connected to a first input lead of the 3×3 fiber optic coupler, and wherein a second input lead of the 3×3 fiber optic coupler is connected to the optical receiver of the host node, and
   wherein a third input lead of the 3×3 fiber optic coupler is configured such that it does not support guiding light, and as such, reflected light can not travel along the third input lead back to the 3×3 fiber optic coupler, and wherein a lead of the delay coil is connected to an output lead of the 3×3 fiber optic coupler, and another lead of the delay coil is connected to an input lead of the 2×2 fiber optic coupler.

2. The optical detection system of claim 1 wherein the optical source includes at least one of a light emitting diode and a laser.

3. The optical detection system of claim 1 wherein the optical source includes at least one of a superluminescent light emitting diode and an edge emitting light emitting diode.

4. The optical detection system of claim 1 wherein the optical source transmits optical signals as light energy in a continuous wave (CW) mode.

5. The optical detection system of claim 1 further comprising a lead cable between the host node and a first of the plurality of fiber optic sensors closest in proximity to the host node, the lead cable being connected to the field node of the first of the plurality of fiber optic sensors.

6. The optical detection system of claim 5 wherein a connection between the output of the optical source and the first input lead of the 3×3 fiber optic coupler, and a connection between the second input lead of the 3×3 fiber optic coupler and the optical receiver of the host node, are provided by the lead cable.

7. The optical detection system of claim 5 wherein a connection between the output of the optical source and the first input lead of the 3×3 fiber optic coupler is provided through a first optical circulator, and a connection between the second input lead of the 3×3 fiber optic coupler and the optical receiver of the host node is provided through a second optical circulator.

8. The optical detection system of claim 1 wherein the host node is configured to receive and interpret the optical intensity information from the plurality of fiber optic sensors, the host node being configured to (1) collect and save a set of data samples over a specified time window; (2) perform a Fourier Transform on the set of data samples within each time window to generate a series of spectra in time; (3) generate a spectral mask representing a vibration spectrum of a predetermined plurality of events; (4) compare spectra of the optical intensity information received from the plurality of fiber optic sensors to the spectral mask to ascertain whether the received optical intensity information exceeds the spectral mask within a time window.

9. The optical detection system of claim 1 wherein the at least one field node converts phase information received from the at least one length of optical fiber into intensity information.

10. An optical detection system for monitoring a pipeline, the optical detection system comprising:
   (a) a host node in the vicinity of, or remote from, a pipeline to be monitored, the host node including (a) an optical source for generating optical signals, and (b) an optical receiver; and
   (b) a plurality of fiber optic sensors local to the pipeline to be monitored, the plurality of fiber optic sensors for converting at least one of vibrational and acoustical energy to optical intensity information, each of the fiber optic sensors including: (1) at least one length of optical fiber configured to sense at least one of vibrational and acoustical energy; (2) a reflector at an end of the at least one length of optical fiber; and (3) at least one field node for receiving optical signals from the host node, the field node transmitting optical signals along the at least one length of optical fiber, the field node receiving optical signals back from the at least one length of optical fiber, and the field node transmitting optical signals to the optical receiver of the host node,
   wherein the host node is configured to receive and interpret the optical intensity information from the plurality of fiber optic sensors, the host node being configured to (1) collect and save a set of data samples over a specified time window; (2) perform a Fourier Transform on the set of data samples within each time window to generate a series of spectra in time; (3) generate a spectral mask representing a vibration spectrum of a predetermined plurality of events; (4) compare spectra of the optical intensity information received from the plurality of fiber optic sensors to the spectral mask to ascertain whether the received optical intensity information exceeds the spectral mask within a time window.

11. The optical detection system of claim 10 wherein the optical source includes at least one of a light emitting diode and a laser.

12. The optical detection system of claim 10 wherein the optical source includes at least one of a superluminescent light emitting diode and an edge emitting light emitting diode.

13. The optical detection system of claim 10 wherein the optical source transmits optical signals as light energy in a continuous wave (CW) mode.

14. The optical detection system of claim 10 wherein each of the fiber optic sensors includes a linearized Sagnac interferometer.

15. The optical detection system of claim 14 wherein the linearized Sagnac interferometer includes a 3×3 fiber optic coupler, a delay coil of optical fiber, a depolarizer, and a 2×2 fiber optic coupler.

16. The optical detection system of claim 15 wherein an output of the optical source is connected to a first input lead of the 3×3 fiber optic coupler, and wherein a second input lead of the 3×3 fiber optic coupler is connected to the optical receiver of the host node.

17. The optical detection system of claim 16 wherein a third input lead of the 3×3 fiber optic coupler is configured such that it does not support guiding light, and as such, reflected light can not travel along the third input lead back to the 3×3 fiber optic coupler, and wherein a lead of the delay coil is connected to an output lead of the 3×3 fiber optic coupler, and another lead of the delay coil is connected to an input lead of the 2×2 fiber optic coupler.

18. The optical detection system of claim 16 further comprising a lead cable between the host node and a first of the plurality of fiber optic sensors closest in proximity to the host node, the lead cable being connected to the field node of the first of the plurality of fiber optic sensors.

19. The optical detection system of claim 18 wherein a connection between the output of the optical source and the first input lead of the 3×3 fiber optic coupler, and a connection between the second input lead of the 3×3 fiber optic coupler and the optical receiver of the host node, are provided by the lead cable.

20. The optical detection system of claim 18 wherein a connection between the output of the optical source and the first input lead of the 3×3 fiber optic coupler is provided through a first optical circulator, and a connection between the second input lead of the 3×3 fiber optic coupler and the optical receiver of the host node is provided through a second optical circulator.

21. The optical detection system of claim 10 wherein the at least one field node converts phase information received from the at least one length of optical fiber into intensity information.

22. The optical detection system of claim 10 wherein each of the fiber optic sensors includes a Michelsen interferometer.

* * * * *